United States Patent [19]
Hubert

[11] Patent Number: 5,566,320
[45] Date of Patent: Oct. 15, 1996

[54] MEMORY STORAGE ACCESS CONTROL CIRCUIT FOR COUPLED MASK-PROGRAMMED MICROCONTROLLERS

[75] Inventor: Rolf Hubert, Bonn, Germany

[73] Assignee: Klöckner-Moeller GmbH, Bonn, Germany

[21] Appl. No.: 86,925

[22] Filed: Jul. 2, 1993

[30] Foreign Application Priority Data

Jul. 4, 1992 [DE] Germany .......................... 42 22 043.2

[51] Int. Cl.⁶ .............................. G06F 13/16; H01J 13/00
[52] U.S. Cl. ................. 395/474; 395/200.05; 364/228.1; 364/230.4; 364/DIG. 1
[58] Field of Search .............................. 395/474, 200.05, 395/200.16

[56] References Cited

U.S. PATENT DOCUMENTS

| | | | |
|---|---|---|---|
| 4,164,787 | 8/1979 | Aranguren | 364/200 |
| 4,698,753 | 10/1987 | Hubbins et al. | 364/200 |
| 4,803,618 | 2/1989 | Ita et al. | 364/200 |
| 5,043,937 | 8/1991 | Glaise et al. | 364/900 |

FOREIGN PATENT DOCUMENTS 3807519  1/1992  Germany .

OTHER PUBLICATIONS

German Industrial Standard DIN 41 859.
German Industrial Standard DIN 44 476.
Technical Publication: Microcontroller, Databook, National Semiconductor Corp., Santa Clara, CA, 1988, pp. 4–35 and 4–53.

Primary Examiner—Eddie P. Chan
Assistant Examiner—Kevin L. Ellis
Attorney, Agent, or Firm—Horst M. Kasper

[57] ABSTRACT

The invention discloses a memory access control for coupled mask-program over microcontrollers in particular in connection with applications for memory storage programmable control in the low-cost region. The coupling of the microcontroller (MC1) and of the memory access authorization to the external program memory storage and data memory storage (7) is thereby based on a hardware wiring circuit in cooperation with a handshake provided by software. Always only one microcontroller accesses the external program memory storage/data memory storage (7) while the other microcontrollers access their internal program memory storage. The memory storage access is coordinated by the microcontroller (MC1) operating as a master through its output port (Px.y). On the hardware side the memory storage access signal (PSEN) and the address access signal (ALE) are multiplexed for the access-authorized microcontroller. The coupling based on hardware uses thereby the bidirectionally operable input-output ports (P0–P3) and their alternative functions.

21 Claims, 4 Drawing Sheets

MEMORY STORAGE ACCESS CONTROL CIRCUIT FOR COUPLED MASK-PROGRAMMED MICROCONTROLLERS

BACKGROUND OF THE INVENTION

1. Field of the Invention

The invention relates to a control for memory storage access for coupled mask-programmed microcontrollers, in particular employed in applications for memory storage programmable control in the low-cost region, with at least two microcontrollers accessing through a joint data bus/address bus onto a joint program memory storage/data memory storage, wherein one of the microcontrollers operates as master and one or more of the microcontrollers operate as slaves, and wherein the communication of the microcontrollers among themselves is controlled based on hardware construction and software operations.

2. Brief Description of the Background of the Invention Including Prior Art

In order to achieve an increase in power of electronic apparatus, in particular in applications for memory storage programmable control in the low-cost region, the concept of distributed systems spreads and is more and more successful. Such a distributed system is based on the coupling of several microcontrollers each representing a central unit, wherein the different tasks of the coupled microcontrollers are processed autarch, autonomous, independently, and parallel. The microcontrollers communicate in this case with each other for the purpose of synchronization and data exchange. If the microcontrollers are not constructed for a multi-processor coupling, wherein one of the microprocessors can stop the second microprocessor, then the coupling is realized according to the state of the art through a dual-port RAM or through a connection of the port pins or through a serial communication. According to the state of the art, a microcomputer has become known in the German Patent Document DE 30 07 519 C2, wherein the microcomputer operates as a master with a like microcomputer operating as a slave, wherein the microcomputers communicate with each other by means of a serial coupling through port pins and serial interfaces. The company brochure *Microcontroller, Databook,* National Semiconductor Corp., Santa Clara, Calif., 1988, pages 4–35 to 4–53 describes a microcontroller, which is also provided for a serial communication in a master-slave method with a like microcontroller. The reference describes a master-slave method which is capable of operating on a bus, wherein the master in each case multiplexes one of several slaves.

It is noted that the conventional methods are either associated with high cost or require increased equipment expenditures or need a substantial processing time.

In a mask-programmed memory storage, the contents of the memory of each element is determined at the production time with a mask, compare for example German Industrial standard DIN 444 76, part 1, January 1982.

Monolithical microprocessors, generally formed as a single-chip, include, in addition to their computing function, a data memory storage and a program memory storage. The memory storages are fixed-programmed and in fact generally by means of a mask. The mask programming is a process, where a specific bit pattern is achieved for the predetermined non-accessing of binary positions.

A master-slave arrangement is an arrangement of two bistable circuits, which effects that the second one of the two bistable circuits, which is called slave, reproduces the starting configuration of the first one of the bistable circuits, and therefore the first bistable circuit is called master. The transition of information from the master part to the slave part is induced by a suitable signal, compare for example German Industrial Standard DIN 418 59, sheet 10.

A master-slave arrangement is an arrangement of a control connection including two or more computers, where one computer operates as master and the other units operate as slaves. The master controls for example the data transmission protocol and coordinates the control and execution functions of the slave(s).

Handshaking relates to a required sequence of signals for communication between system functions. The IO bus-protocol for a system defines its handshaking requirements. Each signal requires a response or reply to complete an input-output operation in an asynchronous IO input-output system.

In particular, handshaking is a central processing unit terminal interface process that prevents overrun and acknowledges signalling. The central processing unit operating as a transmitter sends a signal in response to a request from the central processing unit operating as a receiver, which central processing unit operating as a receiver then sends an acknowledgment signal to the central processing unit operating as a transmitter. Thus, in general, handshaking is an exchange of predetermined signals establishing contact between two data sets.

Devices having differing reaction speeds communicate with each other and come to an agreement relating to the start and the end of an exchange of data.

In the case of the present invention, the agreement between the devices does not relate to the exchange of data between the devices but to an agreement relating to an access control relative to the external program memory storage.

SUMMARY OF THE INVENTION

1. Purposes of the Invention

It is an object of the present invention to provide a memory storage access control for coupled mask-programmed microcontrollers, in particular in applications for memory storage programmable controls in the low-cost region, wherein a different task is furnished to each microcontroller, wherein the tasks are processed independently and parallel, and wherein a data exchange is performed without additional dual-port RAM, and wherein the efficiency of the individual microcontrollers is optimized, and wherein the memory storage access or data memory storage access is performed with minimal additional expenditures and simple means.

It is another object of the present invention to furnish a solution for effective master-slave operations of microprocessors.

It is a further object of the present invention to provide an effective process for assigning random access memory storage to a plurality of microprocessors.

These and other objects and advantages of the present invention will become evident from the description which follows.

2. Brief Description of the Invention

According to the present invention, there is provided for a method for controlling memory storage access with microcontrollers and a memory storage access control circuit for coupled mask-programmed microcontrollers including a common program and/data memory storage furnished as an external program and data memory storage. A program memory storage and a data memory storage are combined to one single unit. A common data and/address bus is connected to the common program memory storage/data memory storage. A data bus and an address bus are combined to one single unit. A first microcontroller accesses the common program memory storage/data memory storage through the common data bus/address bus. A second microcontroller accesses the common program memory storage/ data memory storage through the common data bus/address bus. The first microcontroller is operated as master and the second microcontroller is operated as slave relative to the first microcontroller. A communication link is furnished between the first microcontroller and the second microcontroller. The communication link between the first microcontroller and the second microcontroller is controlled by software and hardware. A first plurality of bidirectionally operable ports is furnished at the first microcontroller. A second plurality of bidirectionally operable ports is furnished at the second microcontroller. The first plurality of bidirectionally operable ports and the second plurality of bidirectionally operable ports are respectively connected in parallel by way of a pin-to-pin wiring. A multiplexer furnishing logical means is connected to the first microcontroller and to the second microcontroller for multiplexing external memory storage release signals and for multiplexing external address release signals of the first microcontroller and of the second microcontroller and by a multiplex signal, delivered by a port used as a slave select port of the first microcontroller representing a master operated as an output. External program memory storage/data memory storage is connected to the multiplexer, to the first microcontroller and to the second microcontroller. The first microcontroller, operating as master, decides by way of its internal mask program which one of the first microcontroller and the second microcontroller should have access authorization to the external program and/data memory storage. An external program and a memory storage are combined to one single unit. The external memory storage release signals and the external address release signals are fed as a memory storage access signal and an address access signal to the external program memory storage/data memory storage. Simultaneously, the multiplex signal delivers the memory storage access signal to the second microcontroller. That one of the first microcontroller and of the second microcontroller, which has not received an external memory storage access authorization, operates its respective bidirectionally operable ports as high resistency inputs based on a mask program.

Terminal connector strips can be connected to memory-storage-programmable controls in the low-cost field.

A plurality of microcontrollers up to an n-th coupled microcontroller can be included, wherein n is larger than 2. Two port outputs used as slave select port outputs of the first microcontroller operating as a master can be used in order to form the multiplex signal and in order to multiplex external memory storage release signals and address release signals of those microcontrollers operating as slaves, and in order to feed the external memory storage release signals and the address release signals to the external program memory storage/data memory storage as memory storage access signal and as address access signal. The multiplex signal can access the logical means, which are provided as n to 1 multiplexer. The multiplex signal can simultaneously command the selected microcontroller to access the external program memory storage/data memory storage through slave select port inputs of the selected microcontroller.

There can also be used m port outputs as slave select port outputs of the first microcontroller operating as a master, wherein n is smaller than $2^m$.

Preferably, the microcontroller, not authorized to the external memory storage access uses again its ports for the external memory storage access only when a non-authorized microcontroller receives its external memory storage access authorization through the microcontroller master based on the multiplex signal, furnished only for this non-authorized microcontroller, and if the memory storage release signal and the address release signal of this non-authorized microcontroller is activated.

The plurality of microcontrollers in each case can exhibit a mask code. Slave select port connectors of the plurality of microcontrollers can be operated as inputs based on the respective mask code.

The mask code of each one of the plurality of microcontrollers beginning with the second microcontroller, coupled to the master microcontroller, can operate an acknowledgment port connector of each one of the plurality of microcontrollers beginning with the second microcontroller as an input with a pull-up resistor. The mask code can switch the acknowledgment port connector as an output during the external memory storage access in order to deliver a message to a master of an external memory storage access.

The first microcontroller representing the master can receive at its acknowledgment port connector a handshaking signal from a microcontroller of the plurality of microcontrollers beginning with the second microcontroller. Said handshaking signal can be furnished to the master for the external memory storage access. This handshaking signal can confirm the memory storage access and the end of the memory storage access of the slave to the master.

An access to the external program memory storage/data memory storage can be furnished to one of the microcontrollers while the remaining microcontrollers can access their internal memory program storage and can process instructions independently from each other.

The first microcontroller, operating as master, can exhibit a mask code. The first microcontroller can operate its port connector as an output based on a mask code.

The mask code of the first microcontroller, operating as master, can operate an acknowledgment port connector of the microcontroller as an input.

The memory storage access control according to the present invention allows to provide a coupling between at least two mask-programmed microcontrollers, wherein the two mask-programmed microcontrollers access a common program memory storage/data memory storage. This memory storage access control represents a lower cost and more efficient system as compared to the state of the art by employing the alternative port functions, which are operated on the software side with the mask code. The memory storage access control according to the present invention is based on a hardware wiring control in connection with a software handshake. Only one microcontroller accesses the external program memory storage/data memory storage, whereas the second microcontroller accesses an internal program code. The memory storage access is coordinated by the master microcontroller through a slave select output port. The memory storage access signal and the address release signal for the access-authorized microcontroller is multiplexed on the hardware side. The hardware coupling uses the bidirectional operation of the input/output ports and their alternative functions of input and output. These alternative functions can be controlled by software as input or output.

The novel features which are considered as characteristic for the invention are set forth in the appended claims. The invention itself, however, both its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENTS

Figure 1:
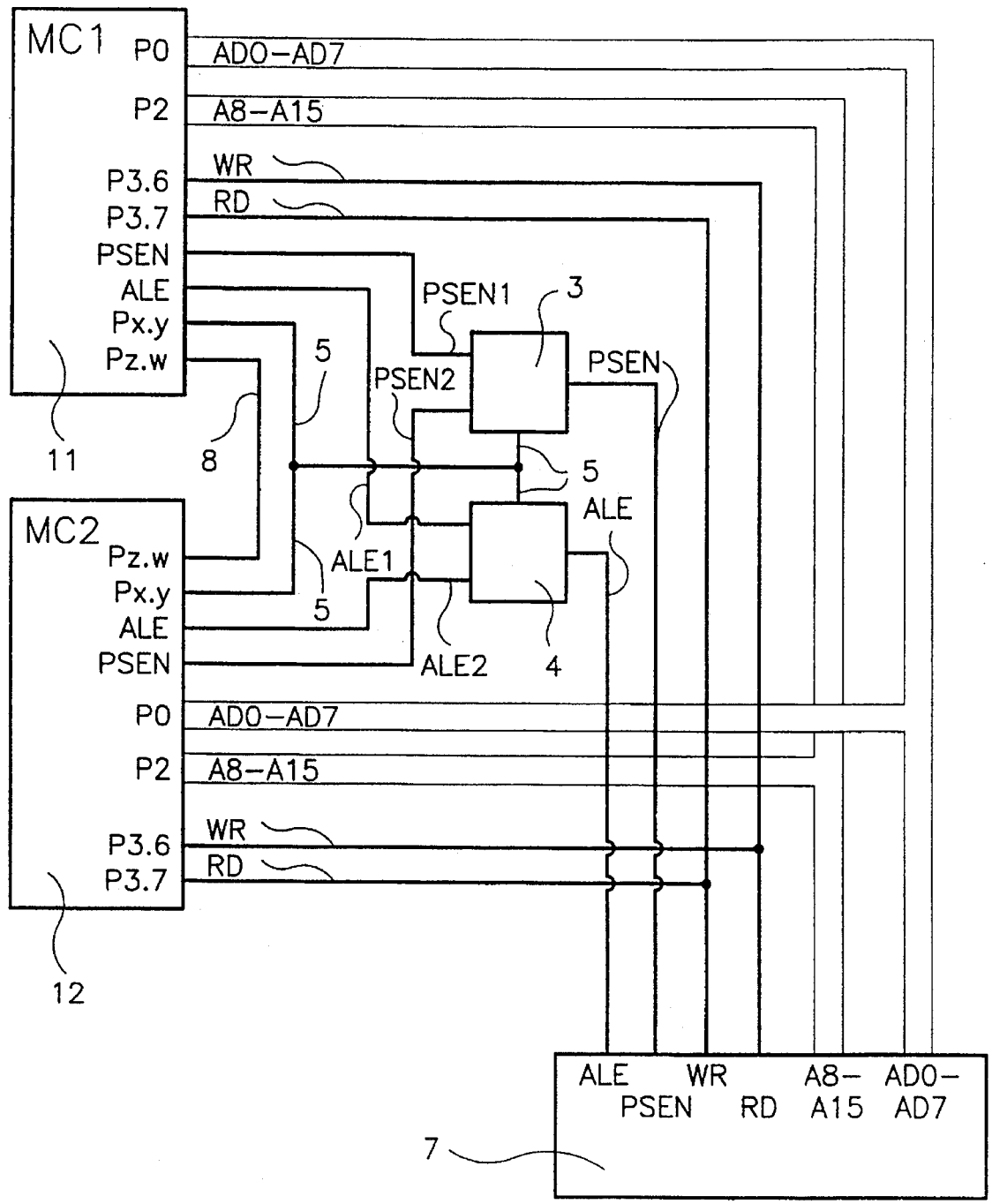
FIG. 1 shows a coupling of two single-chip microcontrollers with a memory storage access control according to the invention.

According to the present invention, there is provided for a memory storage access control for coupled mask-programmed microcontrollers, in particular in connection with applications for memory-storage-programmable controls in the low-cost field. At least a first microcontroller and a second microcontroller access directly a common program memory storage/data memory storage through a common data bus/address bus, wherein the common program memory storage/data memory storage is furnished as an external program and data memory storage. The first microcontroller is operated as master and the second microcontroller is operated as slave. The communication between the first microcontroller and the second microcontroller is controlled by software and hardware. All available, bidirectionally operable ports P0 . . . P3 and their independently operable port connectors Px.y, Pz.w of the first microcontroller and of the second microcontroller MC1, MC2 are respectively connected in parallel by way of a pin-to-pin wiring. The first microcontroller, operating as master, decides by way of its internal mask program which one of the first microcontroller and the second microcontroller should have access authority onto the external program memory storage/data memory storage 7. External memory storage release signals PSEN1, PSEN2 and external address release signals ALE1, ALE2 of the first microcontroller and of the second microcontroller are multiplexed by way of logical means 3, 4 and by a multiplex signal 5, delivered by a slave select port or slave select port connector Px.y of the first microcontroller representing a master operated as an output. The external memory storage release signals PSEN1, PSEN2 and the external address release signals ALE1, ALE2 are fed as a memory storage access signal PSEN and an address access signal ALE to the external program memory storage/data memory storage 7. Simultaneously the multiplex signal 5 delivers the memory storage access to the second microcontroller. That one of the first microcontroller and the second microcontroller, which has not received an external memory storage access authorization, operates its respective bidirectionally operable ports P0 . . . P3 as high resistency inputs based on a mask program.

There can be included a third coupled microcontroller MC1, MC2, MC3 . . . MCn. Two slave select ports or slave select port connectors Px.y, Px1.y of the first microcontroller MC1 operating as a master can be used in order to form the multiplex signal 5, 5a, and in order to multiplex external memory storage release signals PSEN1, PSEN2, PSEN3 . . . PSENn and address release signals ALE1, ALE2, ALE3 . . . ALEn of the microprocessors MC2 . . . MCn operating as slaves, and in order to feed the external memory storage release signals PSEN1, PSEN2, PSEN3 . . . PSENn and the address release signals ALE1, ALE2 . . . ALEn to the external program memory storage/data memory storage 7 as memory storage access signal PSEN and as address access signal ALE. The multiplex signal 5, 5a can access logical means 6, 6a, which are provided as n to 1 multiplexer. The multiplex signal 5, 5a can simultaneously command the selected microcontroller MC1, MC2 to access the memory storage through the slave select ports or slave select port connectors Px.y, Px1.y of the selected microcontroller MC1, MC2.

The microcontroller MC1 . . . MCn, not authorized to the external memory storage access can use again its ports P0–P3 for the external memory storage access only when the non-authorized microcontroller MC1 . . . MCn receives its external memory storage access authorization through the master MC1 based on a multiplex signal 5, furnished only for this non-authorized microcontroller, and if the memory storage release signal PSEN1 . . . PSENn and the address release signal ALE1 . . . ALEn of this non-authorized microcontroller is activated.

Each of the microcontrollers MC2 . . . MCn can exhibit a mask code. The port connectors Px.y of the microcontrollers MC2 . . . MCn can be operated as inputs based on the respective mask code.

The mask code of each one of the microcontrollers MC2 . . . MCn, coupled to the master MC1, can operate the port connector Pz.w of the microcontrollers MC2 . . . MCn as an input with a pull-up resistor. The mask code can switch the port connector Pz.w as an output during the external memory storage access in order to provide a message to the master MC1 of an external memory storage access.

The master MC1 can receive at its port connector Pz.w a handshaking signal 8 from the microcontroller MC1 . . . MCn, furnished to the master MC1 for the external memory storage access. This handshaking signal can confirm the memory storage access and the end of the memory storage access of the slave to the master.

The microcontroller MC1, operating as master, can exhibit a mask code. The microcontroller MC1 can operate its port connector Px.y as an output based on the mask code.

The mask code of the microcontroller MC1, operating as master, can operate the port connector Pz.w of the microcontroller MC1 as an input.

The access to the external program memory storage/data memory storage 7 can be furnished to one of the microcontrollers MC1 ... MCn while the remaining microcontrollers MC1 ... MCn access their internal memory program storage and process instructions independently from each other.

The embodiments of the present invention are employing the mask-programmable 8-bit single-chip microcontroller MAB 8052 AH, which exhibits a programmable memory storage capacity of 8-KByte ROM and which is used as a high-capacity and powerful standard microcontrol in particular for control task in the region of the small memory-programmable or stored-program controls SPC.

FIG. 1 shows a coupling of two 8-bit single-chip microcontrollers together with the memory storage access control according to the invention. In the exemplified applications providing typical examples shown in FIGS. 1 and 2 the type 8052 is employed as a single-chip microcontroller. In contrast, the exemplified embodiment according to FIG. 3 shows a coupling of a microcontroller of the type 80515 to a microcontroller of the type 8052. It is of importance in this connection that these microcontrollers are standard microcontrollers which are commercially widely available and which are frequently employed in industrial applications. Similarly, all other mask-programmable microcontrollers, i.e. microcontrollers with internal program memory storages, can be employed for the coupling with a memory storage access control according to the invention. Mask-programmable fixed-value memory storage includes that the memory contents of each element is fixed at the time of conduction with the aid of a mask. Such elements are defined for example in the German Industrial Standard DIN 44476, part 1 of January 1982.

Two microcontrollers 11, 12 (MC1, MC2) are coupled according to the exemplified embodiments of the invention shown in FIG. 1. According to this application, the following ports are employed for the access of the external program memory storage/data memory storage:

Port 0
 Address Low and data bus. The data bus is a common data line, where several units can be simultaneously connected to this common data line. P0 is a true bidirectional port (tristate). Upon access of the external memory storage, ones are written into the special function register.

Port 2
 Address High. P2 is a quasi bidirectional port with a pull-up resistor. If the external program memory storage is addressed, then the port 2 delivers the upper byte of the program counter. If the external data memory storage is addressed, then this port makes available either DPH (upper byte) or the value of the special function register of port 2. This depends on the program code with which the access to the external memory storage is performed. The special function register P2 remains unchanged.

P3.6
 WR—provides a strobe signal for writing in the external data memory storage. The corresponding bit-intermediate memory storage has to contain a one in the special function register P3.6.

P3.7
 RD—providing a strobe signal for reading from the external data memory storage. The corresponding bit intermediate memory storage has to contain a one in the special function register P3.7.

PSEN
 Memory storage access signal for the reader access to external memory storages. This signal is not activated upon reading of the internal memory storage.

ALE
 Address-access signal for address low at port 0. This signal is activated even in case where no external memory storage access is performed. The address register is a register for receiving memory storage addresses.

Px.y and Pz.w are handshake ports with alternative function, i.e. the handshake ports or handshake port connectors, slave select port Px.y and acknowledgment port or acknowledgment port connector Pz.w can be operated under software control as an input or as an output. Handshaking refers to an operation where apparatus with different reaction speeds are connected and communicate with each other about the start and the end of an exchange of data. Handshaking in the context of the present invention means that a microcontroller sends a signal in response to a request from a receiving microcontroller, where the receiving microcontroller then sends an acknowledgment signal to the emitting microcontroller. In this case, the port P0 is employed for the addresses/data AD0–AD7 and the port P2 is employed for the addresses A8–A15. The port P0 is a bidirectional 8-bit-open-drain-input/output port, which can accept up to 8 (large scale integration transistor/transistor logic) LS-TTL loads or which bidirectional 8-bit-open-drain-input-output port can drive 8 (large scale integration transistor/transistor logic) LS-TTL loads in case of bus operations. The port 2 is a bidirectional 8-bit-input/output-port with internal pull-up resistors, where the bidirectional 8-bit-input/output port can receive or, respectively, drive up to 4 (large scale transistor/transistor logic) LS-TTL loads.

The connection terminal layout of the ports are identical based on the identical or the type uniformity pin configuration type of the two coupled microprocessors. A reset is performed with each new start of the system and initially only the microcontroller MC1, operating as a master, is entitled and empowered to a memory storage access of the external data memory storage and/or program memory storage 7 providing a RAM storage. The hardware-based selection circuit comprises two multiplexers 3, 4. The multiplexer 3, 4, 6, 6a can be of a type SN74HC157 produced and sold by the company Texas Instruments, Dallas, Tex. In data sheet of Texas Instruments from 1982 there is shown on pages 2.220–2.225 the multiplexer type SN74HC157. The two inputs of the multiplexer 3 are occupied with the memory storage release signals designated PSEN1 (port connection PSEN of the master MC1) and PSEN2 (port connection PSEN of the slave MC2). The two inputs of the multiplexer 4 are occupied with the address release signals ALE1—port connection ALE of the master MC1—and ALE2—port connection ALE of the slave MC2. A master-slave configuration includes 2 or more microprocessors or computers, where one computer serves as a master for the control of one or several slaves, where the slaves perform their tasks according to instructions received from the master. A master-slave arrangement is the coordination of two bistable circuits which effects that one of the two bistable circuits designated as a slave reproduces the initial configuration of the first bistable circuit, and where the first bistable circuit is therefore called master. The transition of information from a master part to a slave part is induced by a suitable signal. The port connector Px.y of the master MC1 is furnished for alternative functions of memory storage access and the port connector Px.y is controlled by the internal mask code of the master MC1 and is operated as an output. If the slave select port Px.y is switched to "high", then only the master can access the external data memory storage and/or program memory storage 7. The mask code of the slave MC2 operates its port connector Px.y as an input. The multiplex signal 5 is thus determined by the port exit signal Px.y of the master MC1 and, in case of the presence of a "high" signal, correspondingly multiplexes the memory storage access signal PSEN and the address access signal ALE of the master on the data memory storage and/or program memory storage 7. At the same time, the slave select port being an input Px.y of the slave 12 (MC2) receives this "high" signal and causes the mask program of the slave 12 (MC2) to operate its ports P0 ... P3 as inputs. If the slave 12 (MC2) is now to access the external data memory storage and/or program memory storage, then the slave select port being an output Px.y of the master 11 (MC1) switches to a "low" signal and causes the multiplexers 3, 4 to multiplex the memory storage access signal PSEN and the address release signal of the slave 12 (MC2).

The program memory storage (7, 13) can be CMOS-SCRAM of the type AT3864L produced by the company Atmel, 2125 Nell Dr. San José, Calif. 95131, and is described in the Atmel Corporation CMOS Integrated Circuit Data Book 1991–1992 on pages 6-3 to 6-10.

Based on its mask code, the master 11 (MC1) receives the command to operate and drive its ports P0 ... P3 as inputs and, based on its mask code, the slave MC2 receives the release to access the external program memory storage and/or data memory storage 7. The memory access of the slave 12 (MC2) confirms a handshaking signal to the master 11 (MC1), in that the slave 12 (MC2) switches its acknowledgment port Pz.w, otherwise operating as an input with a pull-up resistor, to operate as an output, for the time duration of the memory access, and the slave 12 (MC2) communicates to the master 11 (MC1) its access start, its access duration, and its access termination with a "low" signal.

Figure 4:
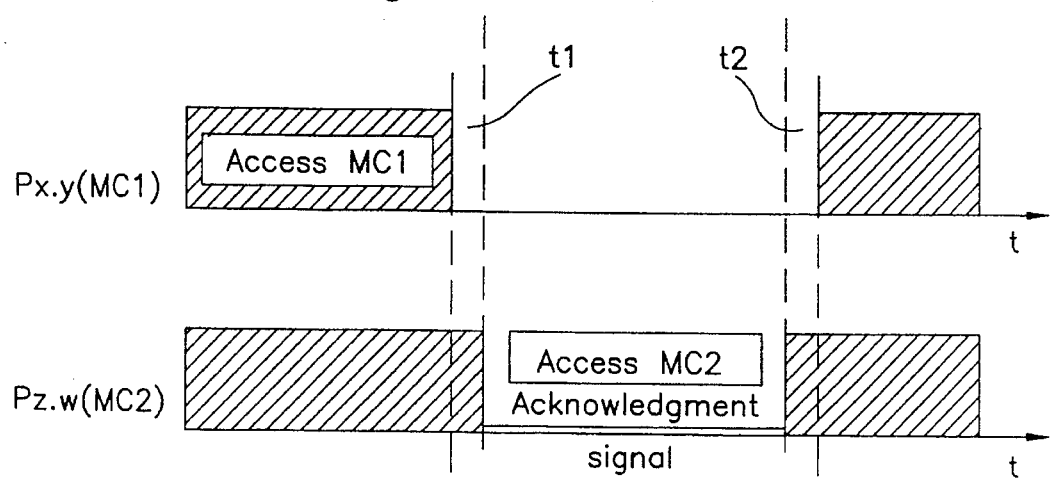
FIG. 4 is a diagram showing time on the abscissa and the handshaking signal of the slave to the master on the ordinate in an access diagram.

FIG. 4 shows the access diagram with the handshaking signal and illustrates the above-described process. The coupling of the 8-bit microcontroller type 8052, shown in the exemplified embodiment of FIG. 1, and the external memory access of the microcontrollers 11, 12 (MC1, MC2) is based on the hardware wiring connection circuit in cooperation with a software handshake. At all times, only one of the microprocessors 11, 12 (MC1, MC2) accesses the external program memory storage and/or data memory storage 7, whereas the second microcontroller accesses only the internal program code. The memory storage access is coordinated by the master 11 (MC1) through a slave select port Px.y. On the hardware side, the memory storage access signal PSEN and the address access signal ALE are multiplexed for the access-authorized microcontroller.

If the two microcontrollers 11, 12 (MC1, MC2) access a common memory storage and only the microcontroller 11 (MC1), operating as a master, as master accesses the program memory storage, then in this case the multiplexing of the memory storage access signal PSEN is not required. In this case, the port exit PSEN is directly wired to the program memory storage and/or data memory storage 7 by the master.

The hardware coupling uses the bidirectional operation of the input/output ports and their alternative functions. These input/output ports can be switched with software to operate as an input or as an output.

Figure 2:
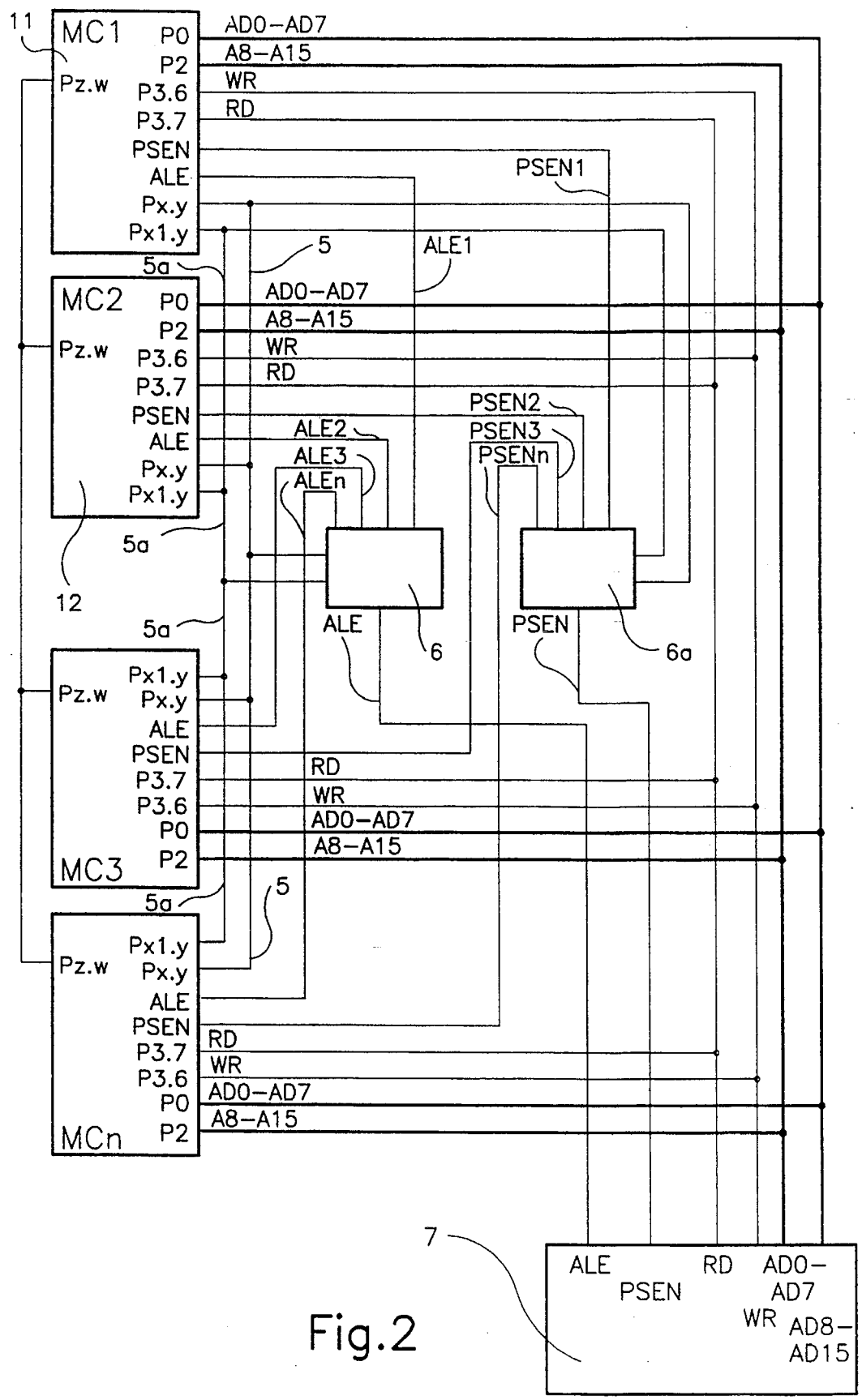
FIG. 2 is a schematic circuit diagram of a coupling of several single-chip microcontrollers with a memory storage access control according to the invention.
Figure 3:
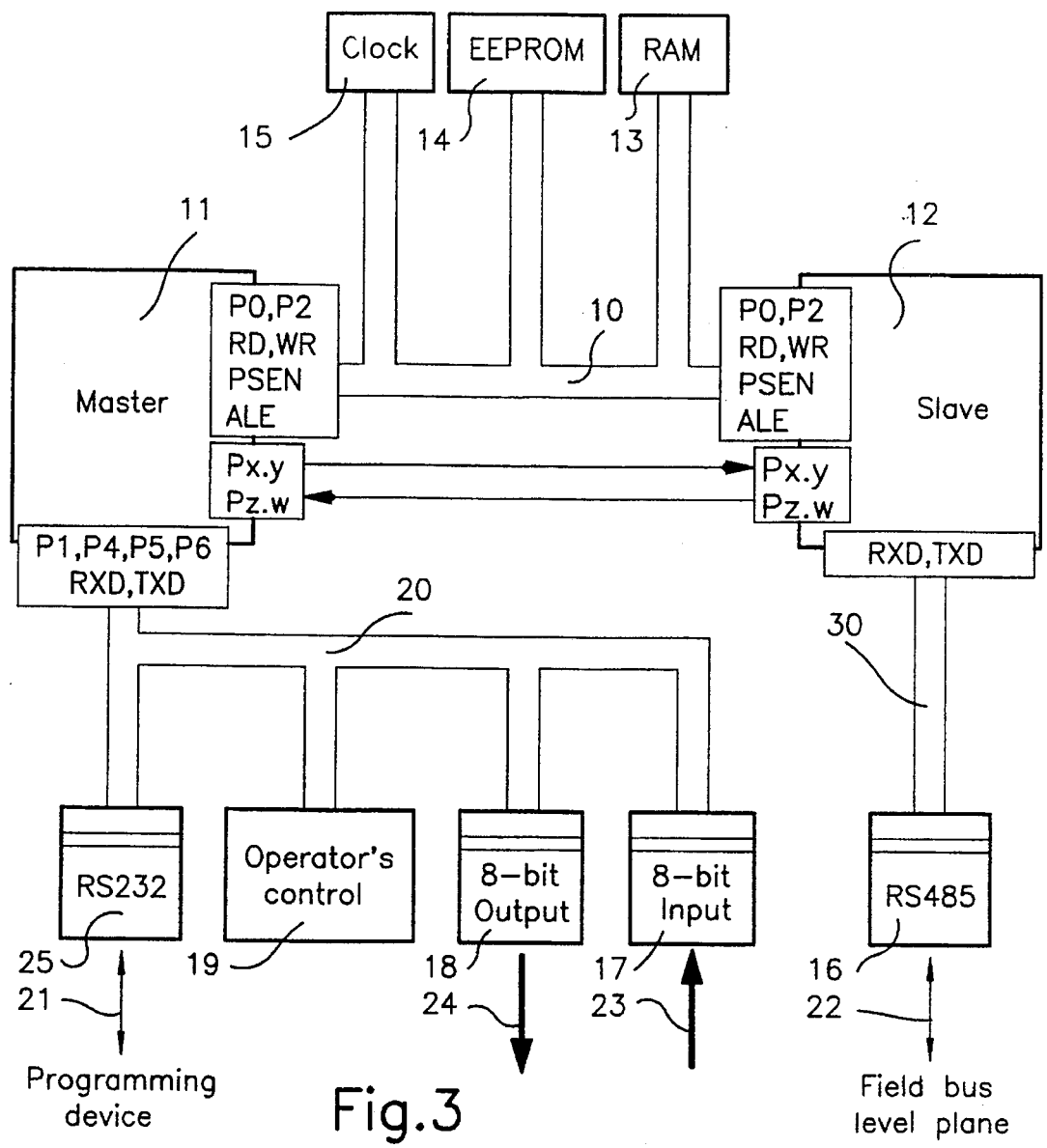
FIG. 3 is a schematic circuit diagram showing a typical application for memory storage programmable control systems, wherein a microcontroller of the type 80515, serving as master, is coupled to a microcontroller of the type 8052 based on a memory storage access control according to the present invention.

The coupling of several single-chip microcontrollers with the memory storage access control according to the invention is shown in FIG. 2. In this case, there are presented microcontrollers of the identical type and, in fact, as in the embodiment illustrated in FIG. 1, microcontrollers of the type 8052. The 8-bit-microcomputer 11, 12 (MC1, MC2 ... MCn) can be of a type 80C52 produced the INTEL corporation.

This CMOS single-chip 8-bit microcomputer is described in a preliminary data sheet by the INTEL company, dated July 1989, having an order number 270757-002, on page 7-179 to page 7-183.

The memory storage access of the individual microcontrollers is handled and coordinated, exactly in the same manner as in the preceding example, by the microcontroller 11 (MC1) operating as master. The hardware wiring circuit comprises in this case also two multiplexers 6, 6a, which can however perform a selection n to 1. For this purpose, an additional slave select port being an output Px1.y is necessary and, in case of more than four coupled microcontrollers, there are required in addition one or several further port outputs with alternate functions. In case there are n microcontrollers coupled according to the invention, at least m ports Px.y, Px1.y, Px(m–1).y are required, wherein $2^m \geq n$ and preferably $2^{m-1} < n$ and wherein the port Px.y is designated as Px0.y.

The multiplex signal is formed by the control lines 5 and 5a. The coding of the master MC1, which is formed out of the signals of the slave select ports Px.y and Px1.y, determines which one of the microcontrollers MC2 ... MCn, operating as slave, is to have access to the external program memory storage and/or data memory storage. All microcontrollers, not authorized to memory storage access, switch their slave select ports Px.y, Px1.y, ..., Px(m–1).y to high resistance inputs and operate independently by processing their internal mask code. This is particularly advantageous in an application, where each microcontroller is furnished with its own tasks and commands, and wherein these tasks and orders are to be processed independently, wherein an access to the external memory storage is possible at any time. The master MC1 decides in this case alone which controller is to access the external program memory storage and/or data memory storage at which time.

A typical application for the memory storage programmable control system is illustrated in FIG. 3. In the embodiment of FIG. 3, a microcontroller of the type 80515 as master 11 and a microcontroller of the type 8052 as slave 12 are coupled to each other by way of the memory storage access control according to the present invention. The master 11 communicates through the peripheral bus 20 with its ports P1, P4, P5, P6 with the external inputs 23 through an 8-fold input device group 17, the outputs 24 through the 8-fold output device group 18 and with the operating elements 19. The operating elements 19 can be sensors for the test functions, run-stop-LED (light-emitting-diode), a short-circuit indicator, an error indicator, and the like.

Operating elements according to the present invention can be sensors for test functions such as for example switches, light-emitting diodes or keys. Furthermore, RUN-STOP light-emitting diodes, general light-emitting diodes can be employed as operating elements for indicating the operating state of the system. A RESET key can be an operating element for resetting the systems into a defined initial state.

Such operating elements can for example be recognized in the front side of the central process unit device-group EBE 223.1 shown in the SUCOS PS 316 programmable controllers listed in the document W27-7210 GB and shown on the front side of the CPU device-group EBE 223.1.

Furthermore, the master 11 is connected through the peripheral bus 20 with its serial interface RXD, TXD through an RS232 interface with a programming device 21. The master 11 is connected with its ports P0, P2, RD, WR to the program memory storage and/or data memory storage RAM 13, to an EEPROM 14, containing the operating system and a clock 15 and, parallel thereto, with the slave 12 through a common data bus/address bus 10.

The UV Erasable CMOS EPROM (14) can be of the type AT27C256R produced by the company Atmel U.K. Ltd. The UV Erasable CMOS EPROM (14) of the type AT27C256R is described in the Atmel CMOS data book 1991–1992 on pages 4-3 to 4-10.

The Teal Time Clock Module (15) can be of the type RTC-62421/62423 produced by the company SEIKO EPSON CORP. The Clock Module of the type RTC-62421/62423 is described in a manual entitled "Teal Time Clock Module" RTC-62421/62423 Application Manual on pages 1–18.

The hardware wiring circuit with the multiplexer device components are not illustrated in this schematic circuit diagram but correspond substantially to the components shown in FIG. 1. After a new start-up of the system, the master 11 accesses the program memory storage and/or data memory storage 7, the EEPROM 14, and the clock 15. The user program is processed by the master 11 (MC1) in the external program memory storage while the slave 12 accesses through its serial interface RXD, TXD, and the serial bus 30 onto the serial interface RS485 16 onto the field bus level plane 22 and communicates with, for example, decentralized disposed network subslave microprocessors.

A field bus is a data net operated by a specific company such as for example SUCONET. The field bus for open communication can be for example the SUCONET-K model of the Klöckner-Moeller Company. This field bus is described in the catalogue Klöckner-Moeller W27-7284 GB including pages 1–20.

The SUCONET field bus for the networking of programmable controllers is further described for the model W27-7141 GB of the Klöckner-Moeller Company in a manual containing 20 pages of October 1990.

Similarly, a profibus is providing a process field bus and is described in a Technical Scientific Publication VER27-759 by Klöckner-Moeller Company and includes 12 pages and was issued in March 1990. The SUCOS PS 316 Programmable Controllers, providing automation systems with versatility to through modular design, are described in the document W27-7210 GB including pages 1–20 and issued in April 1988. This reference gives an overview of conventional modular constructions for increased economy in process control.

A memory storage access of the slave 12 is controlled as in the above-described examples shown in FIGS. 1 and 2. The master 11 delivers the memory storage access to the slave 12 while the communication of the slave 12 remains maintained through the peripheral bus 20. The slave 12 handshakes its memory storage access to the master and handshakes the end of the memory storage access.

An access diagram with the handshaking signal of the slave to the master is illustrated in FIG. 4. As long as the slave select port being an output Px.y of the master MC1 is set to "high", the master has access to the external program memory storage and/or data memory storage 7. If the master 11 (MC1) is now induced based on its mask code to switch its slave select port being an output Px.y to "low", then after a time t1 the handshaking signal of the slave MC2 occurs by switching the acknowledgment port Pz.w as an output and setting the acknowledgment port Pz.w to "low", where the acknowledgment port Pz.w is otherwise operated as an input. After the slave 12 (MC2) is finished, then the slave 12 (MC2) switches its acknowledgment port Pz.w again to operate as an input port and messages the end of the access by the slave 12 (MC2) to the master 11 (MC1). After a time t2, then the master accesses again the external memory storage.

Figure 5:
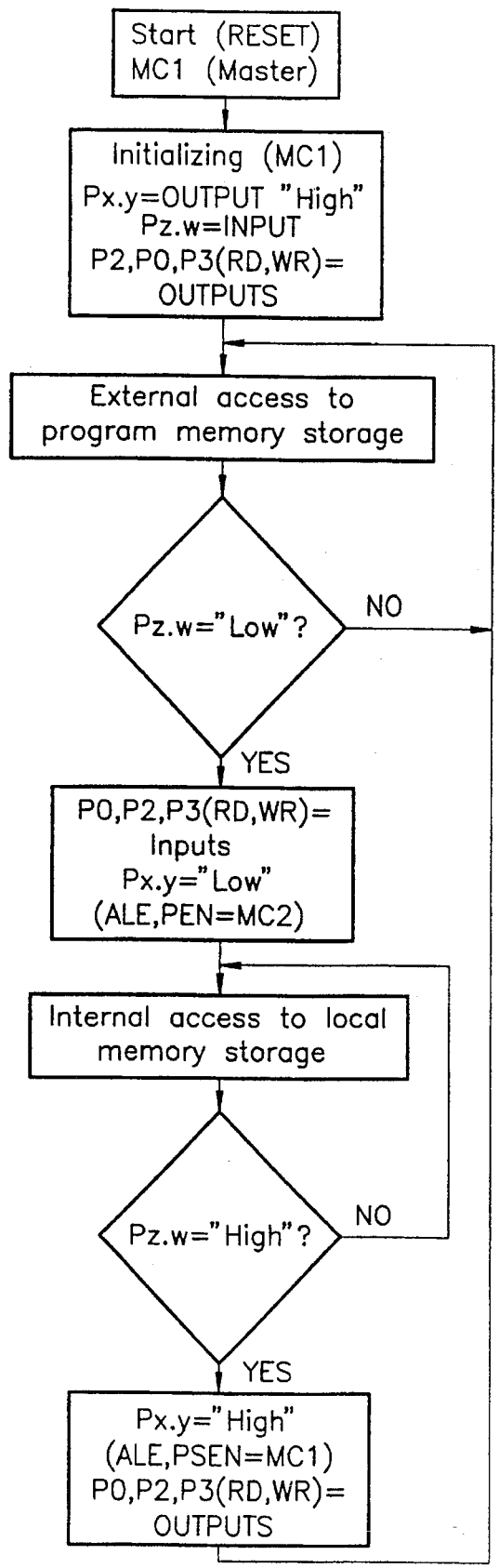
FIG. 5 is a view of a schematic flow diagram showing the access to the external program memory storage by the master controller.
Figure 6:
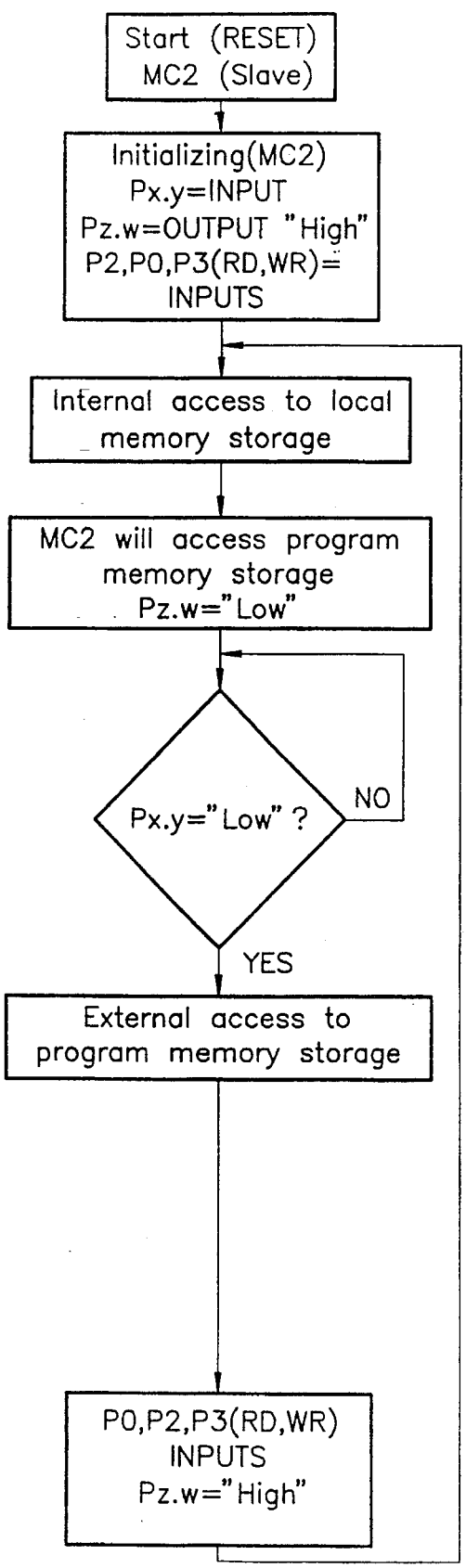
FIG. 6 is a view of a schematic flow diagram showing the access to the external program memory storage by the slave controller.

The flow diagrams shown in FIGS. 5 and 6 clearly indicate the handshaking and acknowledgment between the master and a slave, where two or several microcontrollers access the internal or, respectively, external program memory storage. The alternating action of the memory storage access to the external program memory storage 7 or, respectively, to the own internal memory storage is shown in FIGS. 5 and 6 for the microcontrollers MC1 and MC2 depending on the level state of "high" or "low" of the respective port pins. The FIGS. 5 and 6 show:

a) the access procedure in case of two microcontrollers,
b) the access procedure in case of more than two microcontrollers
c) the access procedure in case of a typical application.

The flow diagrams represent and reflect in detail the respective processes.

It will be understood that each of the elements described above, or two or more together, may also find a useful application in other types of memory storage access controls differing from the types described above.

While the invention has been illustrated and described as embodied in the context of a memory storage access control for coupled mask-programmed microcontrollers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A memory storage access control circuit for coupled mask-programmed microcontrollers comprising an external program and data memory storage;

a common data and address bus directly connected to the external program and data memory storage;

a first microcontroller having a first plurality of bidirectionally operable ports and accessing the external program and data memory storage through the common data and address bus directly connected to the first plurality of bidirectionally operable ports;

a second microcontroller having a second plurality of bidirectionally operable ports connected respectively in parallel to the first bidirectionally operable ports of the first microcontroller by way of a pin-to-pin connection and accessing the external program and memory storage through the common data and address bus, wherein the first microcontroller is operated as a master and wherein the second microcontroller is operated as a slave relative to the first microcontroller;

a communication link furnished between the first microcontroller and the second microcontroller, wherein the communication link between the first microcontroller and the second microcontroller is controlled by software and hardware;

a multiplexer furnishing logical means connected to the external program and data memory storage and to the first microcontroller and to the second microcontroller for multiplexing external memory storage release signals and for multiplexing external address release signals of the first microcontroller and of the second microcontroller by a multiplex signal, delivered by a port used as a slave select port of the first microcontroller, representing the master, and operated as an output wherein the first microcontroller, operating as the master, decides by way of its internal mask program which one of the first microcontroller and the second microcontroller should have access authorization to the external program and data memory storage, and wherein the external memory storage release signals and the external address release signals are fed as a memory storage access signal and an address access signal to the external program and data memory storage, and wherein simultaneously the multiplex signal is used to deliver the memory storage access signal to the second microcontroller, and wherein a mask program of that one of the first microcontroller and the second microcontroller, which has not received an external memory storage access authorization, operates bidirectionally operable ports of the microcontroller without the external memory storage access authorization as high resistency inputs;

a plurality of microcontrollers up to an n-th coupled microcontroller, wherein n represents the total number of microcontrollers and is larger than 2, wherein m port outputs used as slave select port outputs of the first microcontroller operating as a master are used in order to form the multiplex signal and in order to multiplex external memory storage release signals and address release signals of those microprocessors operating as slaves, and in order to feed the external memory storage release signals and the address release signals to the external program and data memory storage as memory storage access signal and as address access signal, wherein n is smaller than 2m, wherein the multiplex signal accesses the logical means, which are provided as n to 1 multiplexer, and wherein the multiplex signal simultaneously commands the selected microcontroller to access the external program and data memory storage through slave select port inputs of the selected microcontroller;

wherein the mask code of each one of the plurality of microcontrollers beginning with the second microcontroller, coupled to the master microcontroller, operates an acknowledgment port connector of each one of the plurality of microcontrollers beginning with the second microcontroller as an input with a pull-up resistor, and wherein the mask code switches the acknowledgment port connector as an output during the external memory storage access in order to deliver a message to a master of an external memory storage access;

wherein the first microcontroller representing the master receives at its acknowledgment port connector a handshaking signal from a microcontroller of the plurality of microcontrollers beginning with the second microcontroller, wherein said handshaking signal is furnished to the master for the external memory storage access, and wherein this handshaking signal confirms the memory storage access and the end of the memory storage access of the slave to the master.

2. The memory storage access control circuit according to claim 1, further comprising terminal connector strips to be connected to memory-storage-programmable controls in the low-cost field.

3. The memory storage access control circuit according to claim 1, wherein two port outputs used as slave select port outputs of the first microcontroller operating as a master are used in order to form the multiplex signal and in order to multiplex external memory storage release signals and address release signals of those microprocessors operating as slaves, and in order to feed the external memory storage release signals and the address release signals to the external program memory storage/data memory storage as memory storage access signal and as address access signal, wherein the multiplex signal accesses the logical means, which are provided as n to 1 multiplexer, and wherein the multiplex signal simultaneously commands the selected microcontroller to access the external program memory storage/data memory storage through slave select port inputs of the selected microcontroller.

4. The memory storage access control circuit according to claim 1, wherein any microcontroller of the plurality of microcontrollers uses its ports for the external memory storage access only when it receives its external memory storage access authorization through the first microcontroller by the multiplex signal and if the memory storage release signal and the address release signal of said any microcontroller of the plurality of microcontrollers is activated.

5. The memory storage access control circuit according to claim 4, wherein each microcontroller of the plurality of microcontrollers contains a mask code, and wherein slave select ports of said each microcontroller of the plurality of microcontrollers are operated as inputs based on the respective mask code.

6. The memory storage access control circuit according to claim 1, wherein an access to the external program and data memory storage is furnished only to one of the plurality of microcontrollers while the remaining microcontrollers access their own internal memory program storage and process instructions independently from each other.

7. The memory storage access control circuit according to claim 1, wherein the first microcontroller, operating as master, contains a mask code, and wherein the first microcontroller operates a slave select port connector of the first microcontroller as an output based on the mask code of the first microcontroller.

8. The memory storage access control circuit according to claim 7, wherein the first microcontroller, operating as master, operates an acknowledgment port connector of the first microcontroller as an input based on the mask code of the first microcontroller.

9. A memory storage access control for coupled mask-programmed microcontrollers comprising a first microcontroller (MC1) having first bidirectionally operable ports (P0 ... P3), a first port connector (Px.y) and a first acknowledgment port connector (Pz.w) accessing directly an external program and data memory storage (7) through a common data and address bus (10);

a second microcontroller (MC2) having second bidirectionally operable ports (P0 ... P3), a second port connector (Px.y) and a second acknowledgment port connector (Pz.w) accessing directly the external program and data memory storage through the common data and address bus wherein the first microcontroller is operated as a master and wherein the second microcontroller is operated as a slave, and wherein communication between the first microcontroller and the second microcontroller is controlled by software and hardware, wherein the first bidirectionally operable ports (P0 ... P3), the first port connector (Px.y) and the first acknowledgment port connector (Pz.w) of the first microcontroller (MC1) and the second bidirectionally operable ports (P0 ... P3), the second port connector (Px.y) and the second acknowledgment port connector (Pz.w) of the second microcontroller (MC2) are connected respectively in parallel by way of a pin-to-pin wiring, wherein the first microcontroller, operating as the master, decides according to an internal mask program, which one of the first microcontroller and the second microcontroller should have access authority to the external program and data memory storage (7), by multiplexing external memory storage release signals (PSEN1, PSEN2) and external address release signals (ALE1, ALE2) of the first microcontroller and of the second microcontroller by way of logical means (3, 4) and by a multiplex signal (5), delivered by the first port connector (Px.y) of the first microcontroller and operated as an output, and wherein the external memory storage release signals (PSEN1, PSEN2) and the external address release signals (ALE1, ALE2), are fed as a memory storage access signal (PSEN) and an address access signal (ALE) to the external program and data memory storage (7), wherein simultaneously the multiplex signal (5) is used to deliver a memory storage access to the second microcontroller, and wherein the internal mask program operates bidirectionally operable ports (P0 . . . P3) of a non-authorized microcontroller as high resistency inputs;

coupled microcontrollers (MC1, MC2, MC3 . . . MCn), each having an internal memory program storage, wherein the first port connector (Px.y) and an additional port connector (Px1.y) of the first microcontroller (MC1) operating as the master are used to form the multiplex signal (5, 5a), and to order multiplexing the external memory storage release signals (PSEN1, PSEN2, PSEN3 . . . PSENn) and the address release signals (ALE1, ALE2, ALE3 . . . ALEn) of the first microcontroller and microcontrollers (MC2 . . . MCn) operating as slaves, and to order to feed the external memory storage release signals (PSEN1, PSEN2, PSEN3 . . . PSENn) and the external address release signals (ALE1, ALE2 . . . ALEn) to the external program and data memory storage (7) as the memory storage access signal (PSEN) and as the address access signal (ALE), wherein the multiplex signal (5, 5a) accesses the logical means (6, 6a), which are provided as n to 1 multiplexer, and wherein the multiplex signal (5, 5a) simultaneously is used to command one of the microcontrollers (MC1, MC2, MC3 . . . MCn) to access the external program and data memory storage wherein a command is sent through port connectors (Px.y, Px1.) of one of the microcontrollers (MC1, MC2, MC3 . . . MCn) having access authorization;

wherein mask code of each one of the microcontrollers (MC2 . . . MCn), coupled to the master (MC1), operate acknowledgment port connector (Pz.w) of the microcontrollers (MC2 . . . MCn) as an input with a pull-up resistor, and wherein the mask code switches the acknowledgment port connector (Pz.w) as an output during the external memory storage access in order to provide a message to the first microcontroller (MC1) by requiring an external memory storage access;

wherein the master (MC1) receives at the first acknowledgment port connector (Pz.w) the message as a handshaking signal (8) from the microcontrollers (MC2 . . . MCn), furnished to the master (MC1) for the external memory storage access, wherein the handshaking signal confirms the external memory storage access and an end of the external memory storage access.

10. The memory storage access control for coupled mask-programmed microcontrollers according to claim 9, wherein one of the coupled microcontrollers (MC1 . . . MCn) uses its ports (P0–P3) for the external memory storage access only when said one of the coupled microcontrollers (MC1 . . . MCn) receives external memory storage access authorization through the first microcontroller (MC1) sent by the multiplex signal (5), furnished only for said one of the coupled microcontrollers (MC1 . . . MCn), and if the memory storage release signal (PSEN1 . . . PSENn) and the address release signal (ALE1 . . . ALEn) of said one of the coupled microcontrollers (MC1 . . . MCn) is activated.

11. The memory storage access control for coupled mask-programmed microcontrollers according to claim 9, wherein each microcontroller of the microcontrollers (MC2 . . . MCn) contains a mask code, and wherein port connectors (Px.y) of said each microcontroller of the microcontrollers (MC2 . . . MCn) are operated as inputs according to its mask code.

12. The memory storage access control for coupled mask-programmed microcontrollers according to claim 9, wherein the first microcontroller (MC1), operating as the master, contains a mask code and wherein the first microcontroller (MC1) operates the first port connector (Px.y) as an output according to the mask code of the first microcontroller.

13. The memory storage access control for coupled mask-programmed microcontrollers according to claim 12, wherein the first microcontroller (MC1), operating as the master, operates the first acknowledgment port connector (Pz.w) of the first microcontroller (MC1) as an input according to the mask code of the first microcontroller.

14. The memory storage access control for coupled mask-programmed microcontrollers according to claim 9, wherein an access to the external program and data memory storage (7) is furnished to one of the coupled microcontrollers (MC1 . . . MCn) while remaining microcontrollers of the coupled microcontrollers (MC1 . . . MCn) access their internal memory program storage based on the mask program and process instructions independently from each other.

15. A method for controlling memory storage access with microcontrollers comprising employing an external program and data memory storage;

employing a common data and address bus connected to the external program and data memory storage;

employing a first microcontroller accessing the external program and data memory storage through the common data and address bus;

employing a second microcontroller accessing the external program and data memory storage through the common data and address bus;

operating the first microcontroller as a master;

operating the second microcontroller as a slave relative to the first microcontroller;

furnishing a communication link between the first microcontroller and the second microcontroller;

controlling the communication link between the first microcontroller and the second microcontroller by software and hardware;

furnishing a first plurality of bidirectionally operable ports at the first microcontroller;

furnishing a second plurality of bidirectionally operable ports at the second microcontroller;

connecting a plurality of independently operable port connectors to the first plurality of bidirectionally operable ports;

connecting the plurality of independently operable port connectors to the second plurality of bidirectionally operable ports, wherein the first plurality of bidirectionally operable ports, the second plurality of bidirectionally operable ports, and the plurality of independently operable port connectors for the first microcontroller and for the second microcontroller are connected respectively in parallel by way of a pin-to-pin wiring;

connecting a multiplexer furnishing logical means to the first microcontroller and to the second microcontroller;

multiplexing external memory storage release signals and multiplexing external address release signals of the first microcontroller and of the second microcontroller and based on a multiplex signal, delivered by a port used as a slave select port of the first microcontroller and operated as an output;

allowing the first microcontroller, operating as master, to decide by way of its internal mask program which one of the first microcontroller and the second microcontroller should have access authorization to the external program and data memory storage;

feeding external memory storage release signals and external address release signals as a memory storage access signal and an address access signal to the external program and data memory storage;

delivering simultaneously the memory storage access signal to the second microcontroller with the multiplex signal;

operating the bidirectionally operable ports of that one of the first microcontroller and the second microcontroller, which has not received an external memory storage access permission, as high resistency inputs according to a mask program;

employing a plurality of microcontrollers up to an n-th coupled microcontroller, wherein n is larger than 2, wherein two port outputs used as slave select port outputs of the first microcontroller operating as a master are used in order to form the multiplex signal and in order to multiplex external memory storage release signals and address release signals of those microcontrollers operating as slaves, and in order to feed the external memory storage release signals and the external address release signals to the external program and data memory storage as memory storage access signal and as address access signal, wherein the multiplex signal accesses the logical means, which are provided as n to 1 multiplexer, and wherein the multiplex signal simultaneously commands the microcontroller with the access authorization to access the external program and data memory storage through the slave select port inputs according to the mask code of the selected microcontroller; delivering a handshaking signal from a microcontroller of the plurality of microcontrollers beginning with the second microcontroller to the first microcontroller representing the master at its acknowledgment port connector, wherein said handshaking signal is furnished to the master after receiving the external memory storage access, and wherein this handshaking signal confirms the memory storage access and the end of the memory storage access of the slave to the master.

16. The method for controlling memory storage access with microcontrollers according to claim 15, further comprising wherein any of the microcontrollers, not authorized to the external memory storage access uses again its ports for the external memory storage access only when receives its external memory storage access authorization through the microcontroller master based on the multiplex signal, furnished only for this non-authorized microcontroller, and if the memory storage release signal and the address release signal of this non-authorized microcontroller is activated.

17. The method for controlling memory storage access with microcontrollers according to claim 15, further comprising operating the port connector of the first microcontroller as an output based on a mask code, wherein the first microcontroller operates as a master and has the mask code incorporated.

18. The method for controlling memory storage access with microcontrollers according to claim 15, wherein the first microcontroller operates as a master and has a mask code incorporated;

operating an acknowledgment port connector of the first microcontroller operating as the master as an input;

operating the acknowledgment port connector of the microcontrollers beginning with the second microcontroller as an input with a pull-up resistor with the mask code of each one of the plurality of microcontrollers beginning with the second microcontroller, coupled to the master microcontroller;

and wherein the mask code switches the acknowledgment port connector as an output during the external memory storage access in order to deliver a message to the master of an external memory storage access.

19. The method for controlling memory storage access with microcontrollers according to claim 15, further comprising furnishing an access signal of the external program and data memory storage to one of the microcontrollers while remaining microcontrollers access their own internal memory program storage and process instructions independently from each other.

20. The method for controlling memory storage access with microcontrollers according to claim 15, further comprising resetting the first microcontroller;

initializing the first plurality of bidirectionally operating ports;

accessing the external program and data memory storage;

determining a state of a first acknowledgment port of the first microcontroller and selected from a first state and a second state;

repeating the step of accessing the external program and data memory storage where a second state was determined;

accessing a first internal program and data memory storage of the first microcontroller where a first state was determined;

determining a state of a first acknowledgment port of the first microcontroller and selected from a first state and a second state;

repeating the step of accessing the first internal program and data memory storage where a first state was determined;

setting the first slave select port to a first state;

repeating the step of accessing the external program and data memory storage where a second state was determined.

21. The method for controlling memory storage access with microcontrollers according to claim 15, further comprising resetting the second microcontroller;

initializing the second plurality of bidirectionally operating ports;

accessing a second internal program and data memory storage of the second microcontroller;

determining a state of a second slave select port of the second microcontroller and selected from a first state and a second state;

repeating the step of determining a state of the second slave select port selected from a first state and a second state where a second state was determined;

accessing the external program and data memory storage where a first state was determined;

setting a second acknowledgment port of the second microcontroller to a first state;

repeating the step of accessing the second internal program and data memory storage.

* * * * *